US005970797A

United States Patent [19]

Hunter

[11] Patent Number: 5,970,797

[45] Date of Patent: Oct. 26, 1999

[54] DIFFERENTIAL PRESSURE DETECTION SYSTEM FOR SIGNALING ELECTRICALLY-ACTIVATED VALVE

[76] Inventor: Lemna J. Hunter, 157 Anya Rd., Corrales, N.Mex. 87048

[21] Appl. No.: 09/186,731

[22] Filed: Nov. 4, 1998

[51] Int. Cl.[6] .......... G01L 7/00

[52] U.S. Cl. .......... 73/756

[58] Field of Search .......... 73/700, 715, 756, 73/714, 718

[56] References Cited

U.S. PATENT DOCUMENTS

| | | | |
|---|---|---|---|
| 2,793,251 | 5/1957 | Deventer | 179/6 |
| 3,055,389 | 9/1962 | Brunner | 137/487 |
| 4,180,088 | 12/1979 | Mallett | 137/87 |
| 4,773,443 | 9/1988 | Maurer | 137/487.5 |
| 5,050,634 | 9/1991 | Fiechtner | 137/486 |
| 5,056,554 | 10/1991 | White | 137/486 |
| 5,220,940 | 6/1993 | Palmer | 137/487.5 |
| 5,251,653 | 10/1993 | Tucker et al. | 137/460 |
| 5,557,049 | 9/1996 | Ratner | 73/715 |

*Primary Examiner*—William Oen
*Attorney, Agent, or Firm*—Holme Roberts & Owen LLP

[57] ABSTRACT

A device and method for sensing a change in differential pressure within a fluid flow is disclosed. In one embodiment, a differential pressure is induced in a flow of fluid through a conduit between first and second axially spaced locations. One side of a diaphragm, piston, or other differential pressure movably responsive member in a differential pressure housing is exposed to the pressure of the flow at the first location, while its opposite side is exposed to the the pressure of the flow at the second location. A extension or the like engages the diaphragm on its high pressure side and passes out through a wall of the differential pressure housing where it is mechanically interconnected with a switch, which in turn is operatively interconnected with a valve in the conduit. Sufficient movement of the diaphragm due to certain change in the differential pressure between the two sides of the diaphragm will physically move the extension which is engaged therewith, which in turn will physically move the switch to a position where a signal is provided to valve to adjust the flow characteristics through the conduit. These movements may be used to identify an underflow condition where the flow rate between the first and second locations is less than a desired flow rate, and/or to identify an overflow condition where the flow rate between the two locations is more than desired.

66 Claims, 6 Drawing Sheets

DIFFERENTIAL PRESSURE DETECTION SYSTEM FOR SIGNALING ELECTRICALLY-ACTIVATED VALVE

FIELD OF THE INVENTION

The present invention generally relates to the field of detecting a change in a differential pressure in a flow through a conduit and, more particularly, to controlling the position of a valve, and thereby in turn the flow characteristics downstream of the valve through the conduit in response to the detection of a certain change(s) in the differential pressure.

BACKGROUND OF THE INVENTION

Many fluid-based applications use some type of device to identify the existence of a leak somewhere in the relevant system. One such application is in the water distribution system for a house or other building structure (e.g., offices). Another involves fuel storage or distribution systems where at least part of the system is stored underground. Yet another application is irrigation systems where relatively large quantities of water are distributed to crops or the like. There are of course many other fluid-based applications where leak detection is desirable or required.

In some cases, the leak detection system exists principally because leaks cannot be readily detected. This is the case in underground fluid flow/storage applications where a visual inspection is not possible, as well as in those cases where a visual inspection is possible but where small leak rates are not readily visually discernible but are in fact important to identify. Other leak detection systems exist so that appropriate actions may be more readily initiated when the leak is detected. Leak detection systems can of course be designed with both of these parameters in mind.

Some leak detection systems are designed to detect a flow condition when there should be no flow. Other leak detection systems are available to detect a leak in a fluid system in which there is a fluid flow. Flow meters are used in both of these instances. Generally, the flow meter will sense an increase in the flow rate (whether from a zero flow condition to at least a certain flow condition, or from a predetermined/preset flow condition to an increased flow condition). Sensing of the increase in the flow rate will typically cause an electrical signal to be sent to some type of control circuit, and this control circuit will in turn send an electrical signal to a valve which will then shut to terminate the flow.

Existing leak detection systems suffer from a number of disadvantages. Some systems are quite complex which obviously increases the cost of the system. For instance, many leak detection systems require their own power source and controller. Increased complexity of the leak detection system can also make integration of the leak detection system into the fluid system more complicated than desired. Other leak detection systems are not what may be termed "generic." That is, some leak detection systems are designed for use with only certain flow rates or a very limited range of flow rates, and may not be appropriate or at least may not be readily adaptable for other applications having significantly different flow rates. Finally, some leak detection systems have an automatic reset feature. Although this may be appropriate for some applications, it is not necessarily appropriate for others.

SUMMARY OF THE INVENTION

The present invention generally relates to a differential pressure detection system which is operatively interfaceable with a valve in a conduit to adjust the flow characteristics downstream of the valve. These adjustments are based upon the differential pressure detection system monitoring a typically artificially induced differential pressure between first and second spaced locations associated with the flow through the conduit. Underflow conditions (less than a desired flow rate) between these two locations may be identified, overflow conditions (more than a desired flow rate) between these two locations may be identified, or both. Moreover, underflow conditions may be identified if the flow between the two locations fails to reach the desired flow rate within a certain time after flow is first initiated, if the flow between the two locations ever falls below the desired flow rate after at least being initially attained, or both.

A first and second aspect of the present invention are each embodied in a differential pressure detection system which includes a differential pressure housing which is separated into two chambers by a partition. At least a portion of this partition is movable, and in one embodiment the partition is a diaphragm and in another embodiment the partition is a piston or some other differential pressure, movably responsive member which may be positioned in the housing. Both of the chambers are fluidly interconnectable with a flow through the conduit wherein a differential pressure is induced between two locations in the flow when there is at least a certain flow rate through the conduit. One of the chambers is fluidly interconnectable with the first of the two subject locations associated with the flow, while the other chamber is fluidly interconnectable with the second of the two subject locations associated with the flow. A differential pressure indicator member engages one side of the movable partition and extends outside of the differential pressure housing. Therefore, as the partition moves in response to a change in the differential pressure between the two subject locations associated with the flow, so to will the differential pressure indicator member.

In the first aspect of the present invention, a switch is operatively interconnectable with the noted valve. This switch includes a first switch member which is movable from a first switch position to a second switch position, as well as a first biasing member which acts on the first switch member to bias the same at least generally toward the differential pressure indicator member. When the differential pressure indicator member has moved less than a predetermined amount through movement of the partition and due to a sensed change in the subject differential pressure, the first switch member will remain (e.g., be retained) in its first position (e.g., through a continued engagement with the differential pressure indicator member). Certain changes in the subject differential pressure, however, will sufficiently move at least part of the partition in the differential pressure housing (e.g., deflect the diaphragm, advance the piston) and correspondingly move the differential pressure indicator member a sufficient distance such that the first switch member is able to move from its first switch position to its second switch position through the action of the first biasing member. Movement of the first switch member from the first switch position to its second switch position may then be used to signal the valve to change its position and alter the flow characteristics downstream of the valve (e.g., to close the valve), or to keep the valve in a previously-established position (e.g., to keep the valve open).

A change in the subject differential pressure which "trips" the system of this first aspect of the present invention may be indicative of an overflow condition (e.g., leak) somewhere within the conduit and which is identified by the flow conditions between the two locations within the flow where the differential pressure is being monitored. The switching of positions by the first switch member in this case may generate a signal which shuts the valve to thereby terminate the flow downstream of the valve. Solenoid valves are appropriate for this first aspect of the present invention and the noted switch may then simply be operatively interfaced with the solenoid valve's power source (i.e., no additional power source is needed and existing componentry is effectively utilized).

A change in the differential pressure which "trips" the system of this first aspect in the above-noted manner may also be indicative of an underflow condition somewhere within the conduit and which is identified by the flow conditions between the two locations in the flow where the differential pressure is being monitored. At least two situations exist where an underflow condition may be present, and each may be addressed by the first aspect of the present invention. One is when a desired flow rate (e.g., steady state) has been achieved between the first and second locations where the differential pressure is being monitored. A subsequent decrease in the flow rate which produces a certain change in the differential pressure may then move the first switch member from its first position to its second position. Movement of the first switch member from its first position to its second position in this case may be used to generate a signal which shuts the valve to thereby terminate the flow downstream of the valve.

Another situation when an underflow condition may be present and which may be addressed by the first aspect relates to when flow is first initiated within the conduit. Sometimes the desired flow rate is not reached after flow is initiated. One way to identify this type of situation with the subject first aspect of the present invention is to have the first switch member move from its first switch position to its second switch position only if the flow between the two locations where the differential pressure is being monitored reaches at least a certain flow rate. Reaching the desired flow rate in this case would generate the differential pressure required to move the first switch member from its first position to its second position. As can be appreciated, it would be necessary for the valve to initially be in an open condition in this case, such that the movement of the first switch member from its first position to its second position could then be used keep the valve it is "open" condition. Therefore, if the first switch member remained in its first position, one would "know" that an underflow condition existed.

The subject first aspect of the present invention may be adapted to open the valve prior to the initiation of flow through the conduit and without moving the first switch member. Instead of referring to first and second switch positions for the first switch member in this adaptation of the first aspect, these two positions will be referred to as "on" and "off" since for one application encompassed by the subject first aspect the "first switch position" may correspond with the first switch member being in an "on position", while in another application encompassed by the subject first aspect the "first switch position" may correspond with the first switch member being in its "off position."

Flow is initiated through the conduit with the first switch member being in its "off position" and with the valve being open in the subject adaptation of the first aspect. One way of opening the valve or making sure it is in its open position is to utilize a timer relay which provides power to the valve for a predetermined amount of time and which opens the valve. If the desired flow rate is reached before the expiration of the predetermined amount of time associated with the timer relay, the differential pressure due to this flow rate will move the partition and differential pressure indicator member an amount such that the first switch member is moved from its "off" position to its "on" position. Power will then continue to be supplied to the valve such that it remains open even after the expiration of the amount of time associated with the timer relay. However, if the desired flow rate is not reached before the expiration of the predetermined amount of time associated with the timer relay, the partition and differential pressure indicator member will not have moved far enough to move the first switch member from its "off" position to its "on" position (e.g., the differential pressure developed by the less than desired flow rate is not sufficient to move the partition and differential pressure indicator member a sufficient distance). With the provision of power to the valve by the timer relay being terminated, and with the first switch member remaining in its "off" position, the valve will then shut such that the underflow condition may then be investigated.

Underflow and overflow conditions may be identified after a steady state flow is achieved between the first and second locations where the subject differential pressure is being monitored as well in the subject adaptation of the first aspect. An increase in the subject differential pressure above a certain amount is equated with an overflow condition which moves the partition and differential pressure indicator member a sufficient distance in a first direction to move the first switch member from its "on" position to its "off" position. Terminating the provision of power to the valve because of the movement of the first switch member to its "off" position causes the valve to terminate the flow downstream of the valve. Similarly, a decrease in the subject differential pressure below a certain amount is equated with an underflow condition which moves the partition and differential pressure indicator member a sufficient distance in a second direction, different from the direction associated with an overflow condition or the first direction, to also move the first switch member from its "on" position to its "off" position. In one embodiment the first and second directions are directly opposite of each other. Terminating the provision of power to the valve because of the movement of the first switch member to its "off" position again causes the valve to terminate flow downstream of the valve.

Biasing of the movable partition in the second direction may be utilized in the subject adaptation of the first aspect where the differential pressure detection system is used to identify both types of the noted underflow conditions and the noted overflow condition as well. The partition may be biased in the second direction or that which is associated with an underflow condition. In this case, a failure for the flow rate to reach the predetermined rate between the first and second locations when flow is first initiated through the conduit will produce a differential pressure which is insufficient to overcome the biasing forces. The first switch member will then remain in its "off" position and the valve will close after the provision of power thereto through the timer relay is terminated as described above. However, if the flow rate reaches the predetermined level, the resulting differential pressure will be sufficient to move the partition and differential pressure indicator member the requisite amount so as to move the first switch member from its "off" position to its "on" position. If this happens before the timer relay terminates the provision of power to the valve, the valve will remain in its "open" condition because of the first switch member being in its "on" position. Any subsequent movement of the first switch member from its "on" position to its "off" position due to a subsequent change in the flow rate and therefore the differential pressure will be as described above (the partition and differential pressure indicator member moving against the biasing forces in the case of an overflow condition, and the partition and differential pressure indicator member moving in the direction of the biasing forces in the case of an underflow condition).

In the second aspect of the present invention, the above-noted differential pressure indicator member includes a partition engaging section and a switch engaging section. The partition engaging section engages the movable partition and the differential pressure indicator member moves along with the partition as it is exposed to changes in the differential pressure between the two chambers of the differential pressure housing. The switch engaging section is movably interconnected with the partition engaging section or an interconnecting structure (e.g., the switch engaging section need only be movable relative to the partition engaging section in this embodiment), moves together therewith, and is disposed outside of the differential pressure housing. A switch, which is operatively interconnected with the noted valve in the conduit, is mechanically interfaceable with the switch engaging section of the differential pressure indicator member. Adjustment of the position of the switch engaging member relative to the partition engaging member varies the amount of differential pressure which must exist between the two chambers in the housing to change the position of the switch when the differential pressure indicator member is mechanically interconnected therewith.

Each of the first and second aspects of the present invention may incorporate a variety of additional features. These features may be used alone or in any combination. Initially, the structure associated with the biasing of the first switch member discussed in relation to the first aspect may be incorporated in the second aspect. Moreover, the structure relating to the adjustability discussed in relation to the second aspect may be incorporated in the first aspect. Further features may be used in either of the first and second aspects as well.

A first conduit section may be fluidly interconnectable with the conduit such that at least a portion of the flow through the conduit passes through the first conduit section, and the above-noted differential pressure housing may be directly mounted on this first conduit section. Splicing the first conduit section into the conduit may also direct the entirety of the flow through the first conduit section. This is relatively simple in an irrigation application as many detachably coupled piping sections are typically utilized. The interior of the first conduit section may also be configured to define a venturi for creating/inducing the desired pressure differential in the flow. Moreover, the differential pressure housing may be molded as a single, generally cup-shaped structure which is "closed" by the first conduit section being appropriately attached to the differential pressure housing.

The above-noted partition which separates the differential pressure housing into a high pressure chamber and a lower pressure chamber, and which has at least a portion thereof which moves to "trip" the differential pressure detection system, may be a diaphragm. In one embodiment such a diaphragm may be configured to enhance the performance of the differential pressure detection system. For instance, the central portion of the diaphragm may be substantially planar and disposed at least substantially perpendicular to the differential pressure indicator member. A perimeter of the diaphragm may then be shaped so as to allow this planar section to maintain its orientation as the diaphragm moves due to changes in the differential pressure between the two chambers in the differential pressure housing. A "wavy" contour or a configuration which at least generally approximates a sinusoidal wave each accomplish this objective. Moreover, these configurations also each allow the diaphragm to have a more consistent response through a wider range of deflection of the planar section of the diaphragm (e.g., the resistance of the diaphragm to movement is more constant throughout a wider range of diaphragm deflections).

The differential pressure housing may also include a biasing member such as a spring or the like as noted in the discussion of the adaptation of the first aspect for addressing at least two types of underflow conditions and at least one type of overflow condition. This partition biasing member may be disposed on the low pressure side of the partition to at least oppose movement of the partition due to an increase in the differential pressure between the two chambers (i.e., the partition biasing member need not be actively exerting a force on the partition at all times). The differential pressure indicator member and partition biasing member also may be disposed on opposite sides of the partition, with the partition biasing member being disposed on the "low" pressure side and the differential pressure indicator member being disposed on the "high" pressure side. Movement of the partition due to an increase in the differential pressure (e.g., due to a leak or excess flow downstream of the valve in the conduit in which the differential pressure detection system is incorporated) may then pull the differential pressure indicator member relative to the housing. Sufficient movement in this manner and the mechanical interface between the differential pressure indicator member and the switch may then cause the switch to change positions and send an appropriate signal to the valve.

A third aspect of the present invention is also directed to a fluid system. The system includes a conduit and structure for creating a differential pressure between two axially spaced locations associated with a flow through the conduit (e.g., a venturi). This differential pressure is monitored through a differential pressure housing which includes a partition. Two chambers are defined by the partition such that one side of the partition is fluidly interconnected with the higher pressure location in the flow and such that its opposite side is fluidly interconnected with the lower pressure location in the flow. Therefore, the differential pressure induced in the conduit is sufficiently replicated in the two chambers of the differential pressure housing defined by the partition.

The system further includes a switch and a valve within the conduit which is operatively interconnected with the switch. This valve may be displaced from the location where the above-noted differential pressure is induced in the conduit, or the differential pressure required for the differential pressure detection system may be created by the valve itself. Nonetheless, the switch is mechanically interconnected with at least that portion of the partition which moves in response to a certain pressure differential. Any of the techniques disclosed above in relation to the first and second aspects may be used to establish this mechanical interconnection, and the other features disclosed above in relation to the first and second aspects may be incorporated in this third aspect as well. Moreover, the switch and partition could be mechanically interconnected in other ways, for instance such that movement of the partition is directly translated to and itself moves the switch. With the subject mechanical interconnection, changes in the differential pressure between the two chambers of the differential pressure housing which cause movement of at least a portion of the partition may also be used to move the switch. Movement of the switch in turn may be used to activate the valve and change its position in the conduit which will in turn change the flow characteristics downstream of the valve (e.g., to shut the valve and terminate any flow through the conduit downstream of the valve).

A fourth aspect of the present invention is directed to a method for monitoring flow through a conduit. A valve is disposed in this conduit and includes a switch. Activation of the switch changes the position of the valve within the conduit, and thereby changes the flow characteristics downstream of the valve. The method includes the step of monitoring the differential pressure between two spaced locations associated with a flow through the conduit using a differential pressure detection system. When the differential pressure exceeds a predetermined amount, the differential pressure detection system is tripped. Tripping of the differential pressure detection system in turn moves the switch from a first position to a second position. Any resetting of the "tripped" differential pressure detection system is precluded until the switch is manually moved from its second position back to its first position.

Various additional features may be incorporated in this fourth aspect of the present invention, and these features may be used alone or in any combination. Tripping of the differential pressure detection system may include moving at least a portion of a partition in the differential pressure housing which defines a high pressure chamber and a low pressure chamber (e.g., such as from the above-noted first and second aspects), moving a differential pressure indicator member along with this partition, and using this movement of the differential pressure indicator member to mechanically move the switch from its first position to its second position. Precluding any resetting of the differential pressure detection system until the switch is manually moved back from its second position to its first position may be realized by disposing at least a portion of the switch in the path of the differential pressure indicator member as it attempts to move along with the partition in response to a subsequent reduction in the degree of differential pressure.

A fifth aspect of the present invention is directed to a fluid system which includes a conduit having a valve therein. The differential pressure detection system includes structure for sensing a differential pressure between first and second locations associated with a flow through the conduit. A switch is operatively interconnected with the valve, is mechanically interfaced with at least a portion of that structure which monitors the differential pressure between the two noted locations, and is movable from a first switch position to a second switch position. This movement is initiated in response to a certain degree of movement by at least a portion of that structure which is monitoring the differential pressure between the two noted locations. Changing the position of the switch is used to change the position of the valve within the conduit and correspondingly change the flow characteristics downstream of the valve (e.g., to terminate the flow).

The above-noted features of the first four aspects of the present invention may be incorporated into this fifth aspect of the present invention as well. For instance, the fifth aspect may further include structure for sensing both an overflow condition between the two locations where the differential pressure is being sensed, as well as an underflow condition between these two locations. At least some common structure is used to sense the subject differential pressure and overflow/underflow conditions.

Finally, a sixth aspect of the present invention is directed to a method for monitoring flow through a conduit having a valve disposed therein, and using a movable differential pressure indicator member. A switch is operatively interconnected with the valve and includes a first switch member. The first switch member is mechanically interconnected with the differential pressure indicator member, and is movable from a first switch position to a second switch position.

The method of this sixth aspect includes sensing the differential between two spaced locations associated with the flow through the conduit. Certain changes in the differential pressure between these two locations moves the differential pressure indicator member. When the differential pressure indicator members moves less than a first predetermined amount, the first switch member is retained in its first position. However, when the differential pressure indicator member moves more than this first predetermined amount, the first switch member moves from its first position to its second position, which in turn changes the position of the valve. The above-noted features of the first five aspects of the present invention may be used in this sixth aspect as well.

DETAILED DESCRIPTION

Figure 1:
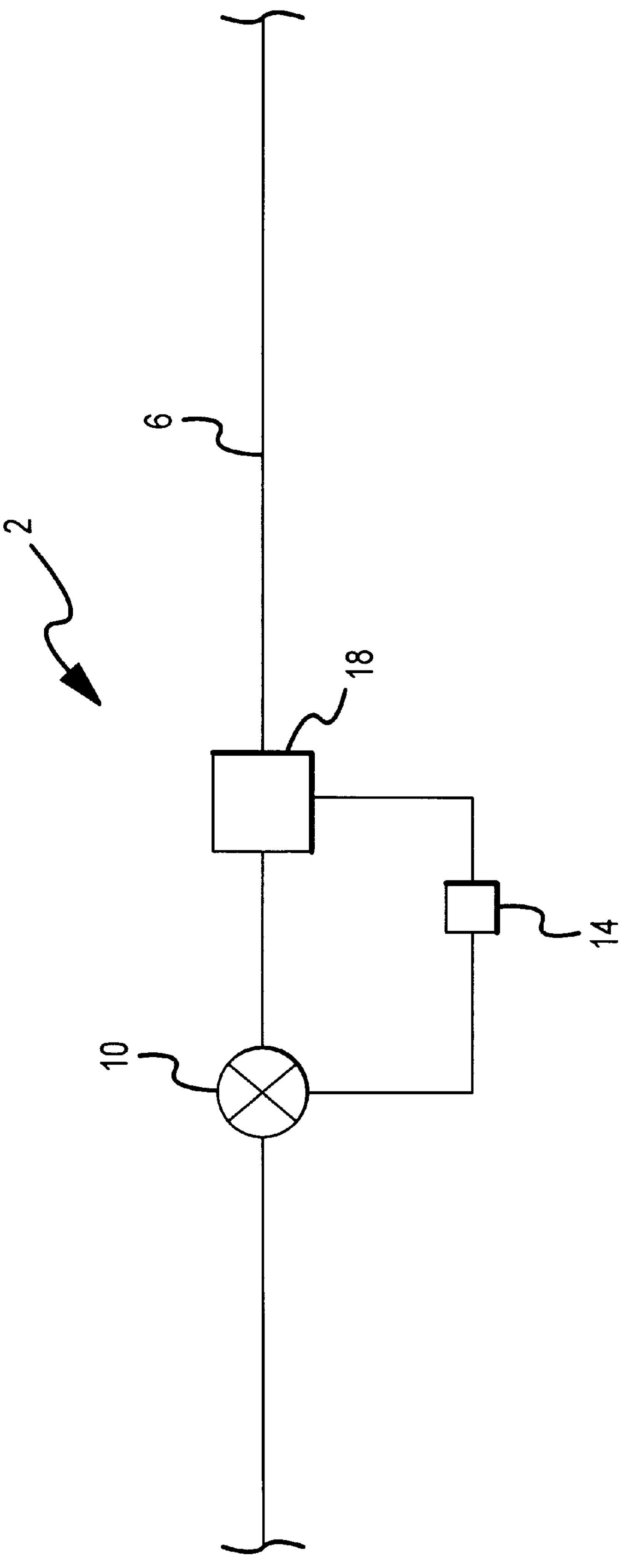
FIG. 1 is a schematic of a fluid flow system which includes a differential pressure detection system.

The present invention will be described in relation to the accompanying drawings which assist in illustrating its various pertinent features. A fluid system 2 is illustrated in FIG. 1 and includes a conduit 6 which contains a fluid flow, a valve 10 for controlling this fluid flow in at least some manner, and a differential pressure detection system 18 which is fluidly interconnected with the conduit 6 and operatively interfaced with the valve 10. More specifically, the valve 10 includes a valve power supply 14 and the differential pressure detection system 18 is operatively interconnected with this valve power supply 14. In one embodiment the valve 10 is of the solenoid type such that with no power being supplied to the valve 10, the valve 10 is either in an "open" or "closed" position, and further such that when power is supplied to the valve 10 the valve 10 is in the opposite position.

The differential pressure detection system 18 may be disposed entirely upstream or downstream of the valve 10, or may "straddle the valve 10. In any case, preferably the differential pressure detection system 18 is disposed at least substantially adjacent to the valve 10 for reasons presented below. When the differential pressure detection system 18 detects at least a certain change in the differential pressure associated with the fluid flow in the conduit 6 and moves a switch 104 through a purely mechanical interface (FIG. 2 and addressed below), the valve power supply 14 causes the valve 10 to move and change the flow characteristics through the conduit 2 downstream of the valve 10. In one embodiment, the fluid system 2 is an irrigation system, and in this case the differential pressure detection system 18 is used to detect an excess flow (e.g., leak) downstream of the valve 10 which warrants terminating the flow within the conduit 6 downstream of the valve 10 by shutting the valve 10.

Figure 2:
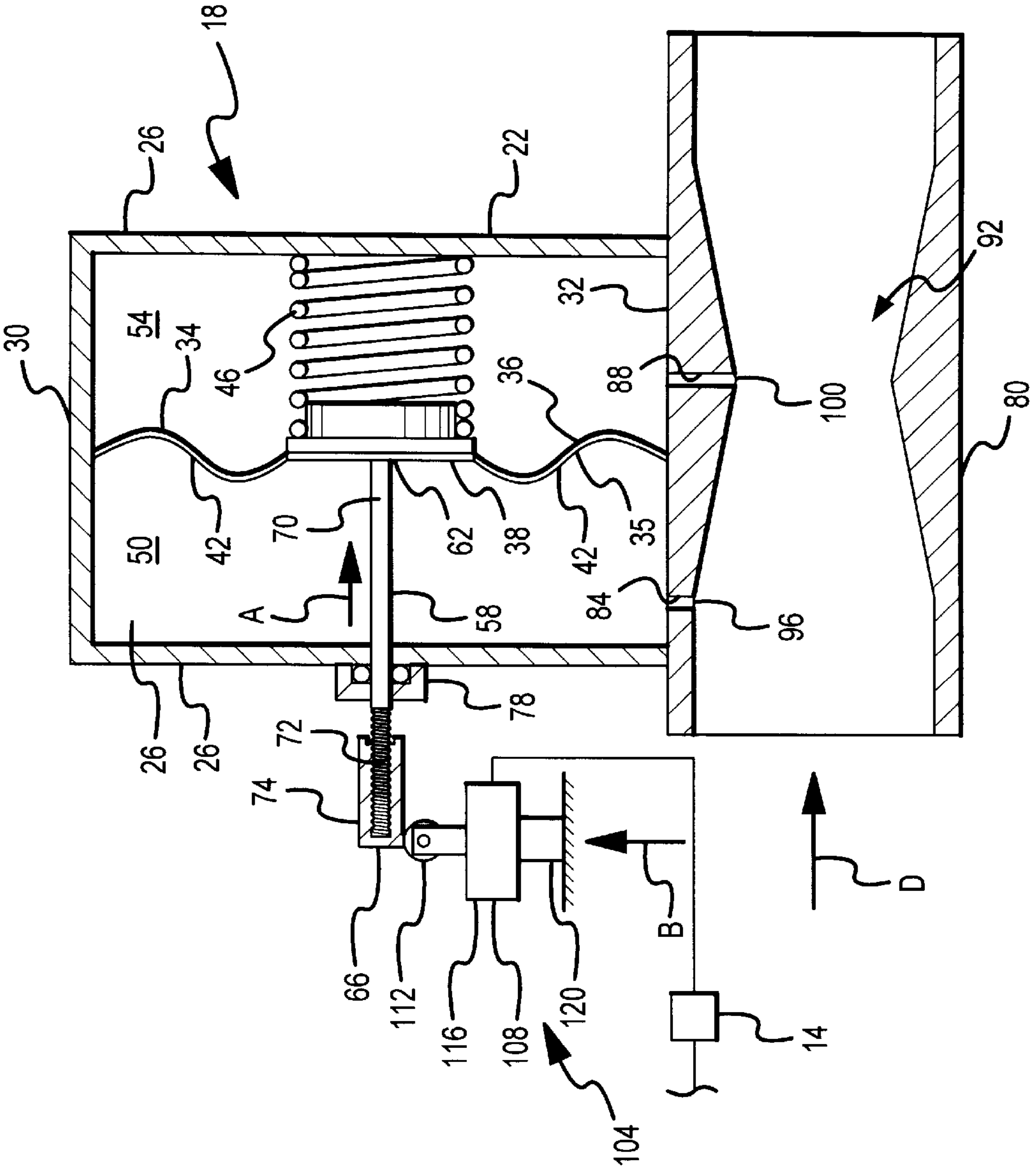
FIG. 2 is a cross-sectional view of one embodiment of a differential pressure detection system which may be used in the fluid system of FIG. 1 and with the switch in a first position wherein the system is in an "untripped" condition.
Figure 3:
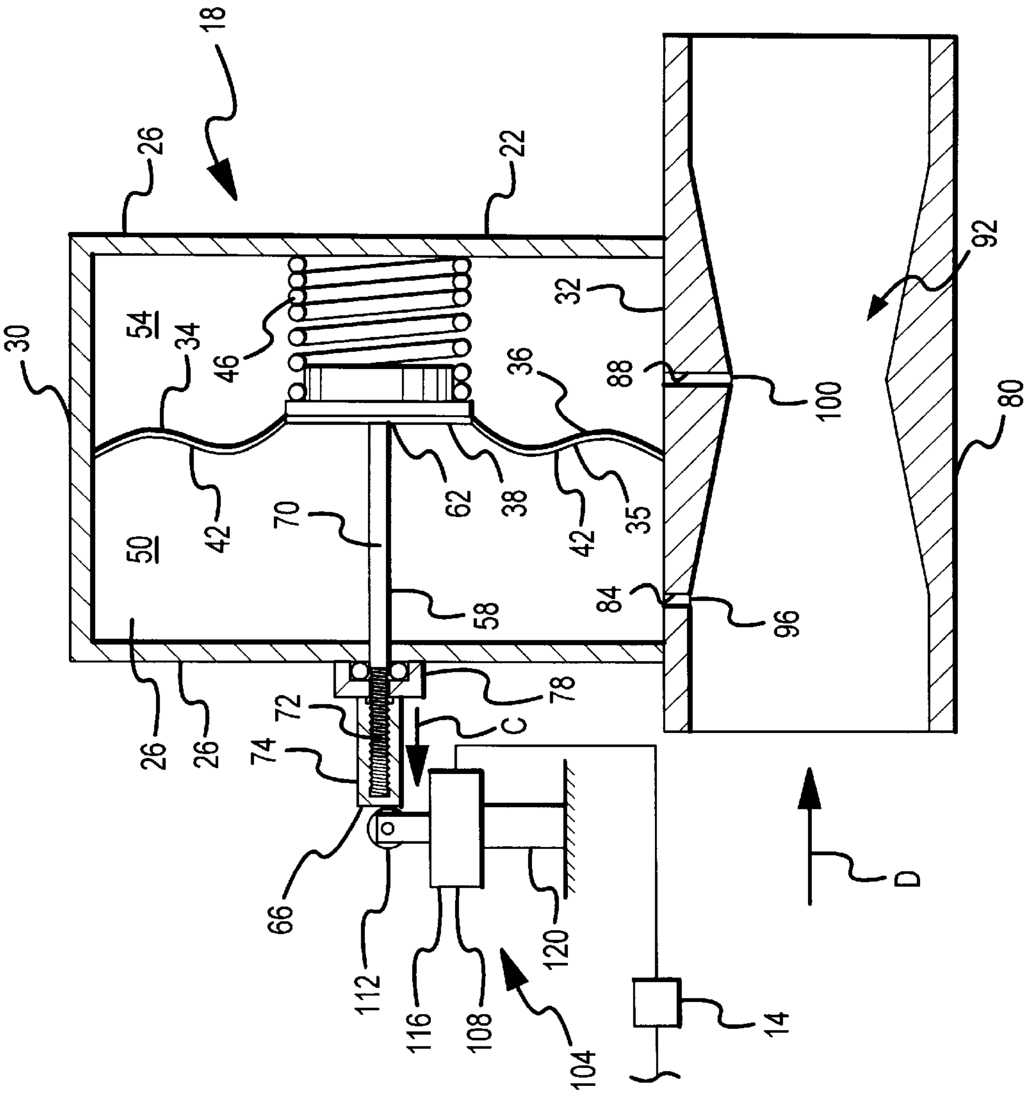
FIG. 3 is cross-sectional view of the differential pressure detection system of FIG. 2 with the switch in its second position wherein the system is in a "tripped" condition.

One embodiment of a differential pressure detection system 18 is more specifically illustrated in FIGS. 2–3. The differential pressure detection system 18 includes a differential pressure housing 22 and an adapter or conduit section 80 that collectively define a substantially enclosed space. In this regard, the differential pressure housing 22 includes at least one sidewall 26 (e.g., cylindrical, a plurality of planar sidewalls) and an end wall 30 which is appropriately interconnected with each of the sidewalls 26. An end 32 of the housing 22 opposite the end wall 30 is open and is configured to mate with the adapter 80 which is appropriately attached to the housing 22 (e.g., by glue, welding, molded, etc). The above-noted configuration of the differential pressure housing 22 is desirable in that the housing 22 may be formed as a unitary or integral structure (i.e., of one-piece construction such that there are no joints in the structure of the housing 22). Therefore, the housing 22 may be formed within an appropriately configured mold to reduce manufacturing costs by molding the housing 22 as a single piece.

A diaphragm 34 is disposed within the differential pressure housing 22 and separates the same into a first chamber 50 and a second chamber 54. The diaphragm 34 thereby functions as a partition of sorts between the first chamber 50 and the second chamber 54. There is a differential pressure between the first and second chambers 50, 54, respectively, which is generated by the configuration of the adapter 80 in the illustrated embodiment. Specifically, the interior of the adapter 80 is contoured to define a venturi 92 which creates a differential pressure in the flow between a first location 96 in the flow and a second location 100 in the flow which is axially spaced from the first location 96. This same differential pressure effectively exists within the differential pressure housing 22 by including a first port 84 which extends through the wall of the adapter 80 to fluidly interconnect the first location 96 with the first chamber 50, and by including a second port 88 which also extends through the wall of the adapter 80 to fluidly interconnect the second location 100 with the second chamber 54. Since the pressure at the first location 96 is higher than the pressure at the second location 100 when the fluid flow is in the direction of the arrow D (as well as in the opposite direction for that matter), the pressure within the first chamber 50 is greater than the pressure in the second chamber 54 of the differential pressure housing 22. Any way of creating a differential pressure at two axially spaced locations in the flow may be utilized, although some ways may be more beneficial than others. For instance, there is a pressure drop across the valve 10 when there is a flow therethrough, such that a self-contained differential pressure housing could have its high pressure chamber fluidly interconnected with the upstream side of the valve 10, and further could have its low pressure chamber fluidly interconnected with the downstream side of the valve 10 (not shown). However, the creation of the differential pressure in the illustrated embodiment does take place at a location which is axially spaced from the valve 10 since the differential pressure detection system 18 is axially spaced from the valve 10 as illustrated in FIG. 1.

Differential pressure between the first chamber 50 and the second chamber 54 moves at least a portion of the diaphragm 34. Movement of the diaphragm 34 in turn is used to "trip" the differential pressure detection system 18 in a manner which will be discussed in more detail below. Other structures may provide the two functions provided by the diaphragm 34, namely to partition the differential pressure housing 22 into the first chamber 50 and the second chamber 54, and further to move in response to a certain amount of differential pressure between these chambers 50 and 54. For instance, the diaphragm 34 could be replaced by a piston or the like (e.g., a differential pressure, movably responsive member) which could be advanced by certain changes in the differential pressure.

The diaphragm 34 is configured to more effectively respond to changes in the differential pressure between the first chamber 50 and the second chamber 54. In this regard, the diaphragm 34 includes a first section 38. This first section 38 is at least substantially centrally disposed on the diaphragm 34 and is at least substantially planar or flat. Surrounding or disposed about the first section 38 of the diaphragm 34 is a second section 42. A wavy contour defines the second section 42, and in the illustrated embodiment the second section 42 may be characterized as at least being generally defined by a sine wave configuration extending from the first section 38 to where the diaphragm 34 engages the interior surface of the differential pressure housing 22 (e.g., sinusoidal configuration). Configuring the diaphragm 34 in the manner presented in FIG. 2 allows the first section 38 to move without any substantial interference from the remainder of the diaphragm 34 and while maintaining its orientation illustrated in FIG. 2. Moreover, the spring constant of the diaphragm 34 is more linear as a result of the illustrated configuration (i.e., the first section 38 of the diaphragm 34 is able to move through a wider range with the resistance of the diaphragm 34 to this movement being more constant throughout this range).

The differential pressure detection system 18 further includes a differential pressure indicator member 58 which is at least generally axially extending and which is movably interconnected with the differential pressure housing 22. The differential pressure indicator member 58 includes a first end 62 which engages a first side 35 of the diaphragm 34 in a manner such that the differential pressure indicator member 58 is at least substantially perpendicular to the first section 38 of the diaphragm 34. A second end 66 of the differential pressure indicator member 58 is spaced from the first end 62 and extends beyond an exterior surface of the differential pressure housing 22. An appropriate seal 78 is utilized to not only seal the first chamber 50 from the environment in which the differential pressure detection system 18 is used (e.g., such that the pressure within the first chamber 50 is sufficiently reflective of the pressure at the first location 96 in the flow), but to also allow the differential pressure indicator member 58 to move relative to the differential pressure housing 22 as the diaphragm 34 deflects due to the existence of at least a certain pressure differential between the first chamber 50 and the second chamber 54 of the differential pressure housing 22.

The differential pressure indicator member 58 includes a diaphragm engaging section or member 70 which includes the above-described first end 62 and which extends from the diaphragm 34, through the first chamber 50, and through the differential pressure housing 22. An end portion 72 of the diaphragm engaging section or member 70 opposite that which interfaces with the diaphragm 34 is threaded. A switch engaging section or member 74 of the differential pressure indicator member 58 is also threaded and is interconnected with the threaded end portion 72 such that the position of the switch engaging section 74 may be changed relative to the diaphragm engaging section 70 of the differential pressure indicator member 58 (e.g., to vary the length of the differential pressure indicator member 58 or the distance between the first end 62 and second end 66). Other ways of establishing the subject movable interconnection may be utilized. Therefore, it is proper to characterize the switch engaging section 74 as being movably interconnected with the diaphragm engaging section 70, and the differential pressure indicator member 58 remains at least substantially axially extending regardless of the position of the switch engaging section 74 relative to the diaphragm engaging section 70. Changing the position of the switch engaging section 74 relative to the diaphragm engaging section 70 changes the effective length of the differential pressure indicator member 58, which in turn changes the amount of differential pressure required before the differential pressure detection system 18 "trips" as will be discussed in more detail below.

The differential pressure detection system 18 further includes a switch 104 which is mechanically interconnected with the differential pressure indicator member 58, more specifically its switch engaging section 74. The switch 104 is also electrically interconnected with the valve power supply 14 which controls the valve 10. The switch 104 alternatively could be interfaced with another type of controller for the valve 10 which would be able to respond appropriately to the signal generated by the mechanical movement of the switch 104 due to the movement of the differential pressure indicator member 58 (not shown).

The switch 104 includes a first switch member 108 which is movable between at least two positions, although typically only two positions will be utilized. The first position is illustrated in FIG. 2 and exists when the differential pressure detection system 18 has not yet been tripped. Generally, sufficient movement of the differential pressure indicator member 58 in the direction of the arrow A, due to an increase in the differential pressure between the first chamber 50 and the second chamber 54 of the differential pressure housing 22, will result in the first switch member 108 moving from its first position of FIG. 2 to its second position illustrated in FIG. 3.

Continuing to refer to FIG. 2, the first switch member 108 includes a roller 112 which is rotatably interconnected with a support 116 of the first switch member 108. A first biasing member 120 (e.g., spring, elastomer) engages the support 116 and biases the same toward the switch engaging section 74 of the differential pressure indicator member 58 or generally in the direction of the arrow B. So long as the differential pressure between the first chamber 50 and the second chamber 54 of the differential pressure housing 22 is less than a predetermined amount, the switch engaging section 74 of the differential pressure indicator member 58 will be disposed so as to retain the first switch member 108 in its first position illustrated in FIG. 2. However, once this threshold differential pressure is exceeded, the differential pressure indicator member 58 will have moved sufficiently along with the diaphragm 34 in the direction of the arrow A such that the switch engaging member 74 will no longer be adequately aligned with the roller 112 of the first switch member 108 (e.g., once the end 66 of the differential pressure indicator member 58 has moved past the rotational axis of the roller 112). Due then to the biasing forces being exerted on the support 116 by the first biasing member 120, the support 116 and roller 112 will be moved from their first position illustrated in FIG. 2 to their second position illustrated in FIG. 3. Once in its second position, the first switch member 108 blocks or precludes movement of the differential pressure indicator member 58 in the direction of the arrow C. Stated another way, the arrangement between the differential pressure indicator member 58 and the first switch member 108 precludes any movement of the differential pressure indicator member 58 in the direction of the arrow C from moving the first switch member 108 from its second position back to its first position based upon any subsequent change in the differential movement which will attempt to initiate this type of movement. Therefore, the first switch member 108 must be manually reset back to its first position before the differential pressure indicator member 58 may resume a "triggered" position by being moved back to a position where it resists movement of the first switch member 108 in the direction of the arrow B (FIG. 2).

Other types of switches may be integrated in the differential pressure detection system 18 than the switch 104 presented above, although the switch 104 provides some advantages (e.g., requires the switch 104 to be manually reset after the system 18 has "tripped. At a minimum, the configuration of any switch which is used in the system 18 must be able to be mechanically linked to the diaphragm 34 or the like such that it may be moved between at least two positions through movement of the diaphragm 34, which may be translated to the switch through the differential pressure indicator member 58.

Forces other than the differential pressure between the first chamber 50 and the second chamber 54 are applied to the diaphragm 34. In this regard, a second biasing member 46 is disposed in the second chamber 54 which in one embodiment is a helical coil spring. One end of the second biasing member 46 engages an interior surface of the differential pressure housing 22 and its opposite end interfaces with the second or low pressure side 36 of the diaphragm 34 in alignment with its first section 38. Biasing forces applied to the diaphragm 34 by the second biasing member 46 are at least generally axially aligned with the differential pressure indicator member 58, or are at least substantially parallel with the member 58. As such, the second biasing member 46 at least opposes movement of the diaphragm 34, and thereby the differential pressure indicator member 58, in the direction of the arrow A by acting on the low pressure side 36 of the diaphragm 34. The second biasing member 46 may also exert an "active" force on the diaphragm 34 at all times. Since the second biasing member 46 at least at some time opposes movement of the differential pressure indicator member 58 in a direction which will eventually "trip" the differential pressure detection system 18, selection of the biasing characteristics (e.g., spring constant) of the second biasing member 46 may be used to modify the differential pressure at which the system 18 will trip. Therefore, the differential pressure detection system 18 may be used in a wide range of flow rates and to "trip" based upon a wide range of differential pressures simply by changing out the second biasing member 46. Another option for changing the differential pressure at which the differential pressure detection system 18 will trip is through the movable interconnection of the switch engaging section 74 and the diaphragm engaging section 70 as described above. Finally, adjustment of the degree of compression of the second biasing member 46 in the "static" position may be provided to modify the differential pressure at which the system 18 trips (e.g., preloading capabilities may be incorporated, but are not shown).

Summarizing the operation of the differential pressure detection system 18, the venturi 92 creates a differential pressure between the first location 96 and the second location 100 in the flow through the adapter 80 which is the same as the flow through the conduit 6 in the illustrated embodiment. This differential pressure is translated to the first chamber 50 and second chamber 54 of the differential pressure housing 22. Forces are thereby exerted on the diaphragm 34 by the differential pressure between the first chamber 50 and the second chamber 54 and which are at least generally in the direction of the arrow A in FIG. 2. The biasing forces generated by the second biasing member 46 oppose these forces and thereby movement of the diaphragm 34 in the direction of the arrow A. So long as the differential pressure between the first chamber 50 and the second chamber 54 is below a certain amount, at least a portion of the switch engaging section 74 of the differential pressure indicator member 58 will be disposed so as to retain the first switch member 108 in its first position illustrated in FIG. 2 and the position of the valve 10 will not be modified through any action by the differential pressure detection system 18.

The magnitude of the differential pressure between the first chamber 50 and the second chamber 54 may change for various reasons, including the development of an excess flow (e.g., leak) in the conduit 6 downstream of the valve 10. If the excess flow (e.g., leak) is of a sufficient magnitude or flow rate, the differential pressure between the first chamber 50 and the second chamber 54 will be sufficient to move the diaphragm 34 to advance the differential pressure indicator member 58 sufficiently in the direction of the arrow A against the biasing forces provided by the second biasing member 46. Sufficient movement of the differential pressure indicator member 58 is defined as that distance where the switch engaging section 74 is misaligned with the first switch member 108 to the point where the switch engaging section 74 is no longer able to oppose the biasing forces of the first biasing member 120 of the switch 104. As a result, the biasing forces of the first biasing member 120 will then move the first switch member 108 from the first position illustrated in FIG. 2 to its second position illustrated in FIG. 3. Movement of the first switch member 108 to its second position through sufficient movement of the differential pressure indicator member 58 causes the valve 10 to change the flow characteristics through the conduit 6 through the interface between the switch 104 and the valve power supply 14 of the valve 10. This again may include terminating the flow through the conduit 6 downstream of the valve 10 by shutting the valve 10.

The above-described differential pressure detection system 18 offers a number of advantages. Initially, the differential pressure detection system 18 makes effective use of components that are already in many fluid-based applications. Solenoid valves are commonly used in irrigation applications to terminate the flow throughout certain portions of the irrigation system. These types of valves are appropriately interconnected with a power source. Therefore, in the case where the valve 10 described herein is one of these types of valves, the valve power supply 14 is "preexisting" and is not added to accommodate the addition of the differential pressure detection system 18 in the fluid system 2.

Another advantage associated with the differential pressure detection system 18 is that the mere identification of a differential pressure of a certain magnitude is used to signal a valve 10 which will then be activated to alter the flow characteristics in the fluid system 2. Flow rates need not be calculated. Instead, the development of a certain differential pressure will move certain parts of the system 18 (e.g., diaphragm 34, differential pressure indicator member 58). Mechanical movements which exceed a certain amount may then be used to mechanically move the switch 104 from an "off" position to an "on" position or vice versa. Appropriately interfacing the switch 104 with the valve 10 will then cause the position of the valve 10 to be changed by the mere change in position of the switch 104 through a mechanical interface with the differential pressure indicator member 58. This presents a simplified way of signaling the valve 10 of the existence, for instance, of a potential leak downstream of the valve 10.

Another advantage of the differential pressure detection system 18 is that once it is tripped, it must be manually reset. That is, any reduction in the differential pressure between the first chamber 50 and the second chamber 54 which occurs after the system 18 has been tripped (i.e., after the first switch member 108 has moved to the position of FIG. 3) will have no effect on the differential pressure detection system 18. A subsequent reduction of the differential pressure between the first chamber 50 and the second chamber 54 after the system 18 has been "tripped" will exert a force on the diaphragm 34 and the differential pressure indicator member 58 which is generally in the direction of the arrow C presented in FIG. 3 (e.g., by the presence of the second biasing member 46, by the configuration of the diaphragm 34). This force, however, does not have an effect on the position first switch member 108 which in fact resists this movement of the differential pressure indicator member 58. That is, a subsequent change in the differential pressure after the system 18 has been tripped does not move the first switch member 108 from the position of FIG. 3 back to the position of FIG. 2. Instead, the first switch member 108 must be manually moved from the second position illustrated in FIG. 3 back to its first position illustrated in FIG. 2. Thereafter, the differential pressure indicator member 58 may be moved back to the position illustrated in FIG. 2 to reset the system 18 for subsequent use in identifying changes in differential pressure which are indicative of, for instance, an excess flow (e.g., leak). Other configurations of switches may provide this function as well. However, this manual reset function need not be used in all applications. Therefore, a configuration of a switch which may be mechanically linked with the diaphragm 34, but which does not provide the manual reset function, may be appropriate for some applications.

Figure 4:
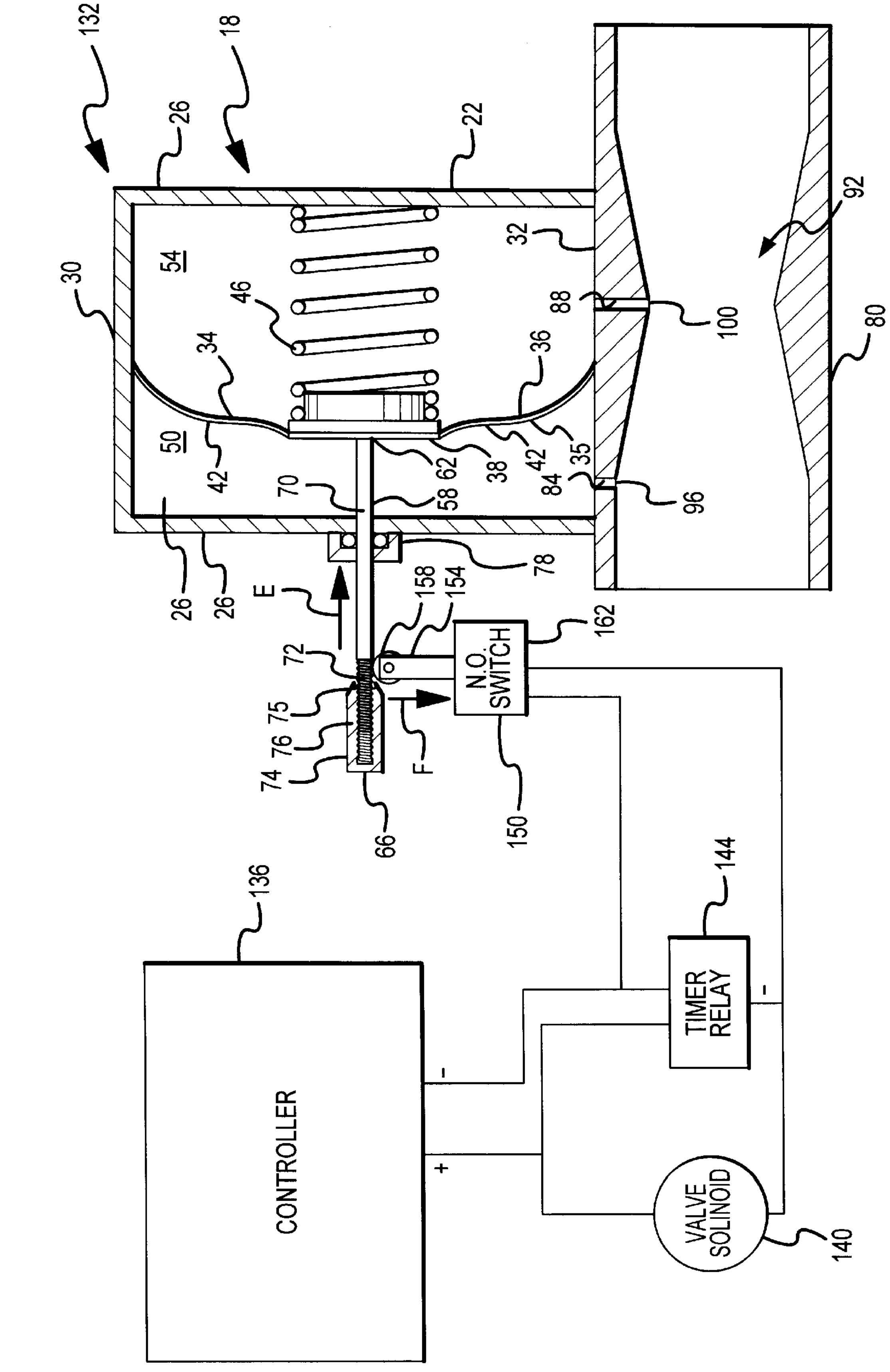
FIG. 4 is a schematic of another fluid flow system which includes the differential pressure detection system used in the fluid flow system of FIGS. 1–3, and which illustrates an underflow condition.
Figure 5:
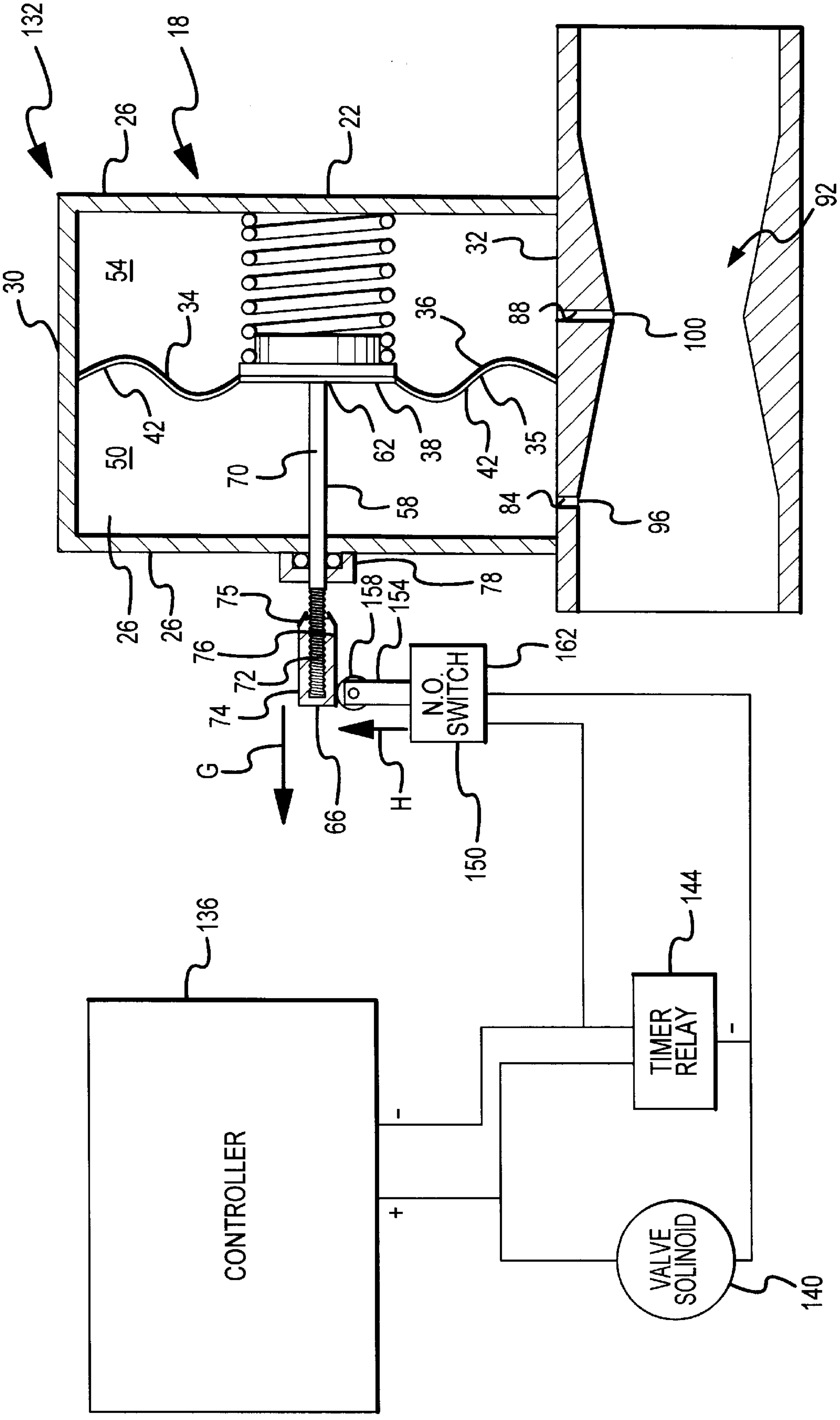
FIG. 5 is a schematic of the fluid flow system of FIG. 4 in a desired steady state flow condition.
Figure 6:
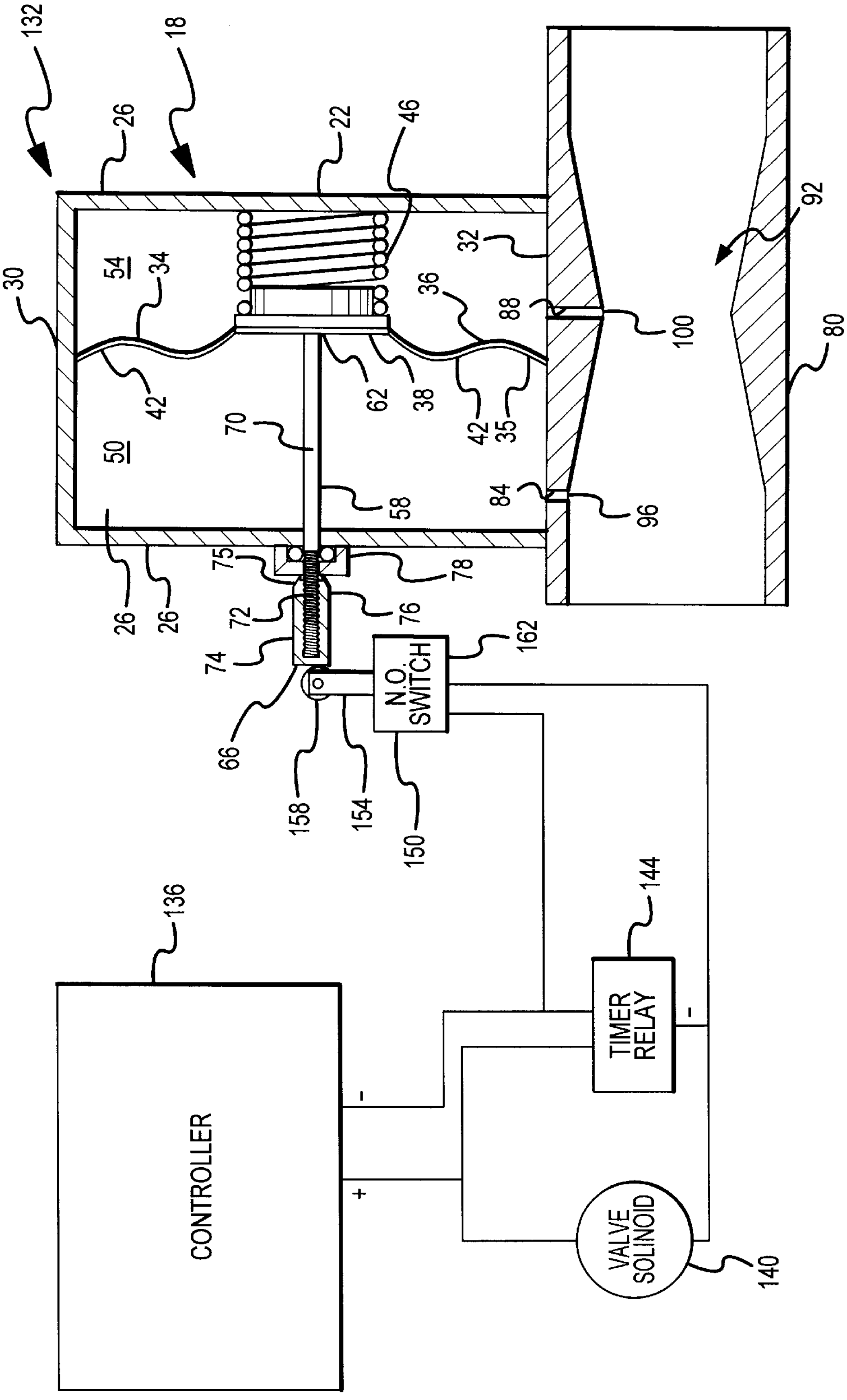
FIG. 6 is a schematic of the fluid flow system of FIG. 4 in an overflow condition.

Other applications may utilize the above-described differential pressure detection system 18. FIGS. 4–6 illustrate a fluid system 132 which utilizes the differential pressure detection system 18 in a manner such that it is able to identify and control not only overflow conditions as described above, but underflow conditions as well. The fluid system 132 includes a controller 136 that is operatively interfaced with a solenoid valve 140 similar to the valve 10 identified above. Therefore, the valve 140 would be disposed within the flow of an appropriate conduit, as is the case with the conduit 6 and valve 10 illustrated in FIG. 1.

Multiple flow conditions are identified by the differential pressure detection system 18 through the type of operative interface established between the differential pressure detection system 18 and the controller 136 and between the controller 136 and the valve 140. In this regard, a switch 150 mechanically interfaces with the switch engaging section 74 of the differential pressure indicator member 58 of the differential pressure detection system 18. The switch 150 is functionally identical to the switch 104 described above, and has a first switch member 154 with a roller 158 disposed on the end thereof which collectively move axially between two positions as in the case of the switch 104 of FIGS. 2–3. The biasing mechanism which is used by the switch 150, however, is contained within its body 162 and as such is not illustrated in FIGS. 4–6. Because of this difference, different reference numbers are being used to identify the switch 104 and the switch 150.

The switch 150 is also operatively interfaced with the controller 136 such that the movement of the switch 150 from one position to another will send an appropriate signal to the controller 136, which will in turn will send an appropriate signal to the valve 140 to change positions and thereby modify the flow characteristics downstream of the valve 140. This is similar to the above-described arrangement. However, the fluid system 132 further includes a timer relay 144 which is operatively interfaced with each of the controller 136 and the solenoid valve 140. Generally, the timer relay 144 provides power from the controller 136 to the valve 140 to open the same when flow is first initiated through the conduit and until a steady state flow rate should be reached. Thereafter, power from the controller 136 must be provided to the valve 140 through the switch 150.

FIG. 4 illustrates the position that the differential pressure detection system 18 and switch 150 will be in during an underflow condition through the conduit in which the valve 140 is disposed. Underflow conditions will exist when flow is first initiated through the conduit. Flow may be initiated through the conduit via a signal from the controller 136 which is initially directed to the solenoid valve 140 through the timer relay 144 (e.g., power provided to the valve 140 in this case is through the timer relay 144). This signal opens the valve 140. The timer relay 144 will maintain the electrical interface between the controller 136 and the solenoid valve 140 for a certain period of time to maintain this open position for the valve 140. Achieving a steady state flow through the conduit within this period of time will result in the differential pressure indicator member 58 moving from the position illustrated in FIG. 4 to the position illustrated in FIG. 5. That is, the differential pressure which will exist between the first chamber 50 of the differential pressure housing 22 and its second chamber 54 under preferred steady state flow conditions will be sufficient to move the partition 34 against the forces of the second biasing member 46 from the position illustrated in FIG. 4 to the position illustrated in FIG. 5. This movement of the partition 34 and differential pressure indicator member 58 will generally be in the direction of the arrow E in FIG. 4 in this case. A transition section 75 of the switch engaging section 74 is configured to facilitate this movement (e.g., chamfered or beveled as shown such that the roller 158 of the switch 150 can appropriately progress up the inclined surface of the transition section 75). This degree of movement of the partition 34 and differential indicator member 58 in turn will mechanically move the switch 150 from its "off" position of FIG. 4 to its "on" position illustrated in FIG. 5. Generally, the above-described movement (arrow E in FIG. 4) will cause the diaphragm engaging section or member 70 to engage and actively act against the biasing member of the switch 150 to move the first switch member 154 and roller 158 generally in the direction of the arrow F in FIG. 4 and change the position of the switch 150 through this movement to its "on" position. With the switch 150 being in the "on" position, power continues to be applied to the solenoid valve 140 by the controller 136 through the switch 150, and the valve 140 thereby remains open.

In some cases a steady state flow rate may not be realized within the desired time. The fluid system 132 addresses this condition. Power is supplied to the valve 140 through the timer relay 144 only for a fixed period of time as noted above. Powering the valve 140 keeps it in an open or "flow" condition in the subject example. After expiration of this fixed period of time, however, power must be supplied from the controller 136 to the valve 140 through the switch 150 in order for the valve 140 to remain in its "open" position. Any failure to reach a preferred steady state flow rate within the predetermined time will result in the differential pressure detection system 18 remaining in the position illustrated in FIG. 4 where the switch 150 is in its "off" position. That is, a lower than preferred steady state flow rate will not generate sufficient differential pressure between the first chamber 50 and the second chamber 54 so as to move the partition 34 and differential pressure indicator member 58 sufficiently in the direction of the arrow E of FIG. 4 such that the roller 158 of the switch 150 is engaging the main body 76 of the switch engaging section 74. This relative positioning is again associated with the switch 150 being in its "on" position (e.g., the position illustrated in FIG. 5). Therefore, the switch 150 remains in its "off" position illustrated in FIG. 4, such that no power is supplied from the controller 136 to the solenoid valve 140 through the switch 150. With no power being provided to the solenoid valve 140 through the timer relay 144 at the expiration of the period of time programmed or input into the timer relay 144, the valve 140 thereby closes or moves from its open position (flow) to its closed position (no flow) with the switch 150 being in its "off" position of FIG. 4.

Identification of a certain reduction in a preferred steady state flow rate is also available from the fluid system 132. During a steady state flow rate condition through the conduit, the differential pressure detection system 18 is in the position where the switch 150 is maintained in its "on" position (e.g., FIG. 5). This is by the roller 158 of the switch 150 being engaged with the body 76 of the switch engaging section 74 of the differential pressure indicator member 58. Power is thereby being provided to the valve 140 by the controller 136 through the switch 150. Certain reductions in the flow rate through the conduit will reduce the differential pressure between the first chamber 50 and the second chamber 54 of the differential pressure detection system 18. At differential pressures associated with flow rates below a certain threshold, the differential pressure between the first chamber 50 and the second chamber 54 will be insufficient to retain the partition 34 and differential pressure indicator member 58 in a position where the roller 158 of the switch 150 will continue to be engaged with the body 76 of the switch engaging section 74 of the differential pressure indicator member 58. That is, the second biasing member 46 will move the partition 34 and the differential pressure indicator member 58 from the position illustrated in FIG. 5 back to the position illustrated in FIG. 4. Stated another way, the forces provided by the biasing member 46 are greater than those forces associated with the subject differential pressure such that the partition 34 and differential pressure indicator member 58 will move generally in the direction of the arrow G in FIG. 5 a sufficient distance such that the roller 158 and body 76 become disengaged. Disengagement of the roller 158 of the switch 150 from the body 76 of the switch engaging section 74 of the differential pressure indicator member 58 allows the first member 154 and roller 158 to move from the "on" position of FIG. 5 to the "off" position of FIG. 4. Recall that the switch 150 is biased to its "off" position. Without proper alignment between the roller 158 and the body 76 of the switch engaging section 74, the first switch member 154 and roller 158 will move a sufficient distance by these biasing forces and generally in the direction of the arrow H in FIG. 5 to where the switch will be in its "off" position. Opening the circuit by this change in positions of the switch 150 will then discontinue the provision of power to the solenoid valve 140 such that it moves from its "open" condition (flow) to its "closed" condition (no flow).

Overflow conditions may also be detected by the fluid system 132 in the same way utilized by the fluid system 2. FIG. 5 again illustrates a condition where the flow through the conduit is at a desired flow rate. The switch 150 is in its "on" position and the valve 140 remains open. Any increase in the flow rate through the conduit above a certain threshold will generate a certain increase in differential pressure between the first chamber 50 and the second chamber 54. This certain increase in the differential pressure will be sufficient to move the partition 34 and the differential pressure 58 from the position illustrated in FIG. 5 to the position illustrated in FIG. 6 (or in the direction of the arrow E depicted in FIG. 4, and which is opposite that which is associated with an underflow condition or arrow G in FIG. 5), and against the forces applied to the partition 34 by the second biasing member 46. This degree of movement of the partition 34 and differential pressure indicator member 58 will introduce a certain degree of misalignment between the body 76 of the switch engaging section 74 and the roller 158 of the switch 150. This certain degree of misalignment will in turn allow the biasing mechanism of the switch 150 to move the first switch member 154 and roller 158 from the "on" position of FIG. 5 to the "off" position of FIG. 6 (by movement of the first switch member 154 and roller 158 in the direction of the arrow H in FIG. 5). Power will then no longer be supplied from the controller 136 to the solenoid valve 140 through the switch 150. Moreover, the time period associated with the timer relay 144 also would have by now expired. Therefore, no power will be supplied to the solenoid valve 140 such that it would move from its "open" position (flow) to its "closed" position (no flow). As in the case of the switch 104, the switch 150 would thereafter have to be manually reset to resume use of the fluid system 132.

Both underflow and overflow conditions which develop after a desired flow rate has been achieved will be identified by the differential pressure detection system 18. In both cases the first switch member 154 and roller 158 are moved from the "on" position to the "off" position by movement generally in the direction of the arrow H in FIG. 5. Biasing forces being exerted on the first switch member 154 and roller 158 in the direction of the arrow H provide a sufficient amount of movement for member 154 and roller 158 to resume the "off" position when the roller 158 becomes sufficiently misaligned with the body 76 of the switch engaging section 74 of the differential pressure indicator member 58. However, the movements of the partition 34 and differential pressure indicator member 58 which address underflow conditions and overflow conditions are at least generally opposite of each other. The partition 34 and differential pressure indicator member 58 move in the direction of the arrow E presented in FIG. 5 to address an overflow condition after a steady state flow rate has been achieved (FIG. 5), and which puts the roller 158 on one end of the switch engaging section 74 (FIG. 6). Conversely, the partition 34 and differential pressure indicator member 58 will move in the direction of the arrow E presented in FIG. 4 to address an underflow condition after a steady state flow rate has been achieved (FIG. 5), and which puts the roller 158 on the opposite end of the switch engaging section 74 (FIG. 4).

The fluid system 132 provides the advantages noted above with regard to the fluid system 2. Additional advantages exist with the fluid system 132. One additional advantage is that it is also able to identify an underflow condition. Appropriate signals are provided to close the solenoid valve 140 such that the identified underflow condition may be investigated. Adaptations could be implemented such that the fluid system 132 would only identify this type of condition (not shown, but could be realized by utilizing a longer diaphragm engaging section 70). However, in its present form the fluid system 132 is not only able to identify an underflow condition, but to identify an overflow condition as well and in the same manner as the fluid system 2 which as described only identifies an overflow condition.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A differential pressure detection system interconnectable with a fluid system comprising a conduit and a valve within said conduit, said differential pressure detection system comprising:

a differential pressure housing at least fluidly interconnectable with first and second axially spaced locations within a flow which passes through said conduit, said housing comprising a partition which separates said housing into first and second chambers, wherein there is a differential pressure between said first and second locations when there is at least a certain flow rate through said conduit;

a first port fluidly interconnected with said first chamber and fluidly interconnectable with said first location;

a second port fluidly interconnected with said second chamber and fluidly interconnectable with said second location;

a differential pressure indicator member comprising first and second ends, said first end being engaged with said partition and said second end extending beyond said housing, wherein said differential pressure indicator member is movable relative to said housing through movement of at least a portion of said partition caused by at least a certain degree of differential pressure between said first and second chambers; and a switch operatively interconnectable with said valve and comprising a first switch member movable from a first switch position to a second position based upon a certain amount of movement of said differential pressure indicator member, said switch comprising a first biasing member acting on said first switch member toward said differential pressure indicator member, wherein said first switch member is remains in said first switch position said differential pressure indicator member has moved less than a predetermined amount, and wherein said first switch member moves from said first switch position to said second switch position through said first biasing member when said differential pressure indicator member has moved more than said predetermined amount.

2. A system, as claimed in claim 1, further comprising:

a first conduit section fluidly interconnectable with said conduit whereby at least a portion of a flow through said conduit goes through said first conduit section, wherein said housing is mounted directly on said first conduit section, wherein said first and second locations are located within said first conduit section, and wherein said first and second ports extend through said first conduit section to said first and second locations, respectively.

3. A system, as claimed in claim 2, wherein:

said first conduit section comprises a venturi, and wherein said first location is at a higher pressure than said second location when there is at least a certain flow rate through said conduit.

4. A system, as claimed in claim 2, wherein:

said housing comprises a first opening and said first conduit section at least substantially closes said first opening when said first conduit section is attached to said housing.

5. A system, as claimed in claim 2, wherein:

said housing is a unitary structure such that said housing is free from any joints.

6. A system, as claimed in claim 1, wherein:

said partition is a diaphragm which comprises a first section which is at least substantially planar and disposed at least substantially perpendicular to and aligned with said differential pressure indicator member, wherein said diaphragm further comprises a second section disposed about said first section and which is defined by a generally wavy contour.

7. A system, as claimed in claim 6, wherein:

said generally wavy contour at least approximates a sinusoidal wave.

8. A system, as claimed in claim 1, wherein:

said differential pressure indicator member comprises a first section having said first end and a second section movably interconnected with said first section and defining said second end, said first section being engaged with said partition and said second section being mechanically engaged with said first switch member, wherein an adjustment of a position of said second section of said differential pressure indicator member relative to said first section of said differential pressure indicator member varies an amount of differential pressure required to activate said switch by having said first switch member move from said first switch position to said second switch position.

9. A system, as claimed in claim 1, further comprising:

a second biasing member disposed within said housing and acting on said partition.

10. A system, as claimed in claim 9, wherein:

said second biasing member and said differential pressure indicator member act on opposite sides of said partition.

11. A system, as claimed in claim 9, wherein:

said first chamber is at a higher pressure than said second chamber when there is at least a certain flow rate through said conduit, said biasing member biases said partition in a direction of said first chamber and away from said second chamber, and said differential pressure indicator member is disposed within said first chamber, wherein an increase in said differential pressure between said first and second chambers which is sufficient to overcome said second biasing member pulls said differential pressure indicator member at least generally away from said first switch member.

12. A system, as claimed in claim 9, wherein:

said second biasing member comprises a spring.

13. A system, as claimed in claim 1, wherein:

said first switch member and said differential pressure indicator member are disposed relative to each other whereby said first switch member being in said second switch position precludes at least a certain degree of movement of said differential pressure indicator member away from said partition.

14. A system, as claimed in claim 1, further comprising:

means for creating a differential pressure between said first and second axially spaced locations.

15. A system, as claimed in claim 14, wherein:

said differential pressure indicator member engages said partition on a side which defines said first chamber;

said system further comprises a second biasing member disposed within said second chamber which opposes movement of said differential pressure indicator member in a direction at least generally from said first chamber and toward said second chamber; and after said differential pressure indicator member has moved said certain amount such that said first switch member moves from said first switch position to said second switch position, at least a certain degree of movement of said differential pressure indicator member in a direction which is at least generally away from said partition is precluded by said first switch member being in said second switch position.

16. A system, as claimed in claim 1, wherein:

said valve is a solenoid valve comprising a first power source, and wherein said switch is electrically interconnected with said first power source.

17. A system, as claimed in claim 1, wherein:

said valve is a shut-off valve, wherein movement of said first switch member from said first switch position to said second switch position activates said valve to terminate flow downstream of said valve.

18. A system, as claimed in claim 1, wherein:

said first switch member moves from said first switch position to said second switch position when there is an overflow condition through said valve, said overflow condition being when a flow rate through said valve is more than a predetermined amount.

19. A system, as claimed in claim 1, wherein:

said first switch member moves from said first switch position to said second switch position when said flow through said conduit and then said valve reaches a first flow rate within a first time period after said flow is initiated within said conduit.

20. A system, as claimed in claim 19, wherein:

said first switch member remains in said first switch position when there is an underflow condition through said valve, said underflow condition being when said flow through said valve fails to reach said first flow rate within said first time period after said flow is initiated within said conduit.

21. A system, as claimed in claim 1, wherein:

said first switch member moves from said first switch position to said second switch position when there is an underflow condition through said valve, said underflow condition being when a flow rate through said valve is less than a predetermined amount.

22. A system, as claimed in claim 1, further comprising:

means for sensing both an overflow condition and an underflow condition through said valve, said overflow condition being when a flow rate through said valve is more than a predetermined amount and said underflow condition being when said flow rate through said valve is less than a predetermined amount.

23. A system, as claimed in claim 1, wherein:

said first switch member moves from said first switch position to said second switch position based upon a first predetermined amount of movement of said differential pressure indicator member in a first direction which corresponds with an overflow condition through said valve, said overflow condition being when a flow rate through said valve is more than a predetermined amount; and said first switch member also moves from said first switch position to said second switch position based upon a second predetermined amount of movement of said differential pressure indicator member in a second direction which corresponds with an underflow condition through said valve, said underflow condition being when said flow rate through said valve is less than a predetermined amount, said second direction being different than said first direction.

24. A differential pressure detector system interconnectable with a fluid system comprising a conduit, a valve within said conduit, and a switch operatively interconnected with said valve, said differential pressure detector system comprising:

a differential pressure housing at least fluidly interconnectable with first and second axially spaced locations within a flow which passes through said conduit, said housing comprising a partition which separates said housing into first and second chambers, wherein there is a differential pressure between said first and second locations associated with a flow through said conduit;

a first port fluidly interconnected with said first chamber and fluidly interconnectable with said first location;

a second port fluidly interconnected with said second chamber and fluidly interconnectable with said second location;

a differential pressure indicator member comprising a partition engaging member and a switch engaging member, said partition engaging member being engaged with said partition and at least a portion of said switch engaging member being disposed outside of said housing, wherein said differential pressure indicator member is movable relative to said housing through movement of at least a portion of said partition relative to said differential pressure housing caused by differential pressure between said first and second chambers, and wherein said switch engaging member is movably interconnected with said partition engaging member and mechanically interfaceable with said switch, wherein an adjustment of a position of said switch engaging member relative to said partition engaging member varies an amount of differential pressure required to activate said switch.

25. A system, as claimed in claim 24, further comprising:

a first conduit section fluidly interconnectable with said conduit whereby at least a portion of a flow through said conduit goes through said first conduit section, wherein said housing is mounted directly on said first conduit section, wherein said first and second locations are located within said first conduit section, and wherein said first and second ports extend through said first conduit section to said first and second locations, respectively.

26. A system, as claimed in claim 25, wherein:

said first conduit section comprises a venturi, and wherein said first location is at a higher pressure than said second location.

27. A system, as claimed in claim 25, wherein:

said housing comprises a first opening and said first conduit section at least substantially closes said first opening.

28. A system, as claimed in claim 25, wherein:

said housing is a unitary structure such that said housing is free from any joints.

29. A system, as claimed in claim 24, wherein:

said partition is a diaphragm which comprises a first section which is at least substantially planar and disposed at least substantially perpendicular to and aligned with said partition engaging member of said differential pressure indicator member, wherein said partition further comprises a second section disposed about said first section and which is defined by a generally wavy contour.

30. A system, as claimed in claim 29, wherein:

said generally wavy contour at least approximates a sinusoidal wave.

31. A system, as claimed in claim 24, further comprising:

a first biasing member disposed within said housing and acting on said partition.

32. A system, as claimed in claim 31, wherein:

said first biasing member and said differential pressure indicator member act on opposite sides of said partition.

33. A system, as claimed in claim 31, wherein:

said first chamber is at a higher pressure than said second chamber when there is at least a certain flow rate through said conduit, said first biasing member biasing said partition in a direction of said first chamber and away from said second chamber, and said differential pressure indicator member being disposed within said first chamber, wherein an increase in said differential pressure between said first and second chambers which is sufficient to overcome said first biasing member pulls said differential pressure indicator member relative to said housing and at least generally away from said switch.

34. A system, as claimed in claim 31, wherein:

said first biasing member comprises a spring.

35. A system, as claimed in claim 24, wherein:

said switch engaging member is threadably interconnected with said partition engaging member.

36. A system, as claimed in claim 24, further comprising:

a first switch member electrically interconnectable with said valve and movable between at least first and second positions, said system further comprising a first biasing member acting on said first switch member toward said switch engaging member of said differential pressure indicator member, wherein said first switch member is engaged with said switch engaging member when in said first position and when said differential pressure indicator member has moved less than a predetermined amount, and wherein said first switch member moves from said first position to said second position through said first biasing member when said differential pressure indicator member has moved more than said predetermined amount.

37. A system, as claimed in claim 36, wherein:

said first switch member and said differential pressure indicator member are disposed relative to each other whereby said first switch member being in said second position precludes at least a certain degree of movement of said differential pressure indicator away from said partition after said first switch member has moved from said first position to said second position.

38. A system, as claimed in claim 36, further comprising:

means for generating a differential pressure between said first and second locations, said first location being at a higher pressure than said second location when there is at least said certain flow rate through said conduit, and wherein:

said differential pressure indicator member engages said partition on a side which defines said first chamber;

said system further comprises a second biasing member disposed within said second chamber which opposes movement of said differential pressure indicator member in a direction at least generally from said first chamber and toward said second chamber; and after said differential pressure indicator member has moved said predetermined amount such that said first switch member moves from said first position to said second position, at least a certain degree of movement of said differential pressure indicator member in a direction which is at least generally away from said partition is precluded by said first switch member being in said second position.

39. A system, as claimed in claim 36, wherein:

said valve is a solenoid valve comprising a first power source, wherein said first switch member is electrically interconnected with said first power source.

40. A system, as claimed in claim 36, wherein:

said valve is a shut-off valve, wherein movement of said first switch member from said first position to said second position activates said valve to terminate flow downstream of said valve.

41. A system, as claimed in claim 24, further comprising:

means for creating a differential pressure between said first and second locations.

42. A differential pressure detection system, comprising:

a conduit;

means for creating a differential pressure between first and second axially displaced locations associated with a flow through said conduit;

a differential pressure housing comprising a partition which separates said housing into first and second chambers, said first chamber being fluidly interconnected with said first location and said second chamber being fluidly interconnected with said second location;

a switch;

a valve within said conduit and operatively interconnected with said switch; and means for mechanically interconnecting said partition with said switch.

43. A system, as claimed in claim 42, wherein:

said means for creating a differential pressure comprises a venturi.

44. A system, as claimed in claim 42, wherein:

said valve comprises a first power source and wherein said switch is operatively interconnected with said first power source.

45. A system, as claimed in claim 42, wherein:

said means for mechanically interconnecting comprises:

a differential pressure indicator member comprising first and second ends, said first end being engaged with said partition and said second end extending through said housing, wherein said differential pressure indicator member is movable relative to said housing through movement of said partition caused by at least a certain degree of differential pressure between said first and second chambers; and a first switch member movable from a first switch position to a second switch position based upon a certain amount of movement of said differential pressure indicator member, wherein said first switch member is mechanically interconnected with said differential pressure indicator member and wherein said switch comprises said first switch member.

46. A system, as claimed in claim 45, further comprising:

a first biasing member acting on said first switch member toward said differential pressure indicator member, wherein said first switch member is retained in said first switch position by said differential pressure indicator member when said differential pressure indicator member has moved less than a predetermined amount, and wherein said first switch member moves from said first switch position to said second switch position through said first biasing member when said differential pressure indicator member has moved more than said predetermined amount.

47. A system, as claimed in claim 45, wherein:

said differential pressure indicator member comprises a first section defining said first end and a second section movably interconnected with said first section and defining said second end, said first section being engaged with said partition and said second section being mechanically interfaceable with said first switch member, wherein an adjustment of a position of said second section of said differential pressure indicator member relative to said first section of said differential pressure indicator member varies an amount of differential pressure required to activate said switch by moving said first switch member from said first position to said second position.

48. A system, as claimed in claim 45, wherein:

said first switch member moves from said first switch position to said second switch position when there is an overflow condition through said valve, said overflow condition being when a flow rate through said valve is more than a predetermined amount.

49. A system, as claimed in claim 45, wherein:

said first switch member moves from said first switch position to said second switch position when said flow through said valve reaches a first flow rate within a first time period after said flow is initiated within said conduit.

50. A system, as claimed in claim 49, wherein:

said first switch member remains in said first switch position when there is an underflow condition through said valve, said underflow condition being when said flow through said valve fails to reach said first flow rate within said first time period after said flow is initiated within said conduit.

51. A system, as claimed in claim 45, wherein:

said first switch member moves from said first switch position to said second switch position when there is an underflow condition through said valve, said underflow condition being when a flow rate through said valve is less than a predetermined amount.

52. A system, as claimed in claim 45, further comprising:

means for sensing both an overflow condition and an underflow condition through said valve, said overflow condition being when a flow rate through said valve is more than a predetermined amount and said underflow condition being when said flow rate through said valve is less than a predetermined amount.

53. A system, as claimed in claim 45, wherein:

said first switch member moves from said first switch position to said second switch position based upon a first predetermined amount of movement of said differential pressure indicator member in a first direction which corresponds with an overflow condition through said valve, said overflow condition being when said flow rate through said valve is more than a predetermined amount; and said first switch member also moves from said first switch position to said second switch position based upon a second predetermined amount of movement of said differential pressure indicator member in a second direction which corresponds with an underflow condition through said valve, said underflow condition being when said flow rate through said valve is less than a predetermined amount, said second direction being different than said first direction.

54. A method for monitoring flow through a conduit, wherein a first valve is disposed in said conduit and a first switch is operatively interconnected with said first valve, said first switch comprising a first switch member, said method comprising the steps of:

monitoring a differential pressure between first and second axially spaced locations associated with a flow through said conduit, said monitoring step using a differential pressure detector system;

tripping said differential pressure detector system when said differential pressure from said monitoring step is more than a predetermined amount;

moving said first switch member from a first position to a second position upon any execution of said tripping step; and precluding any resetting of said differential pressure detector system after any execution of said tripping step until after manually moving said first switch member from said second position back to said first position.

55. A method, as claimed in claim 54, wherein said differential pressure detector system comprises a partition and a differential pressure indicator member engaged with said partition, and wherein:

said tripping step comprises moving at least a portion of said partition, moving said differential pressure indicator member by said moving at least a portion of said partition step, and moving said first switch member from said first position to said second position through said moving said differential pressure indicator member step.

56. A method, as claimed in claim 55, wherein:

said precluding step comprises disposing at least a portion of said first switch member in a path of said differential pressure engagement member in a direction at least generally away from said partition.

57. A differential pressure detection system interconnectable with a fluid system comprising a conduit and a valve within said conduit, said differential pressure detection system comprising:

first means for sensing a differential pressure between first and second locations associated with a flow through said conduit;

a switch operatively interconnectable with said valve, mechanically interfaced with said means for sensing, and movable from a first switch position to a second switch position based upon a certain amount of movement by said first means for sensing and said mechanical interface, said first switch position corresponding with said valve being in a first valve position and said second switch position corresponding with said valve being in a second valve position which is different from said first valve position.

58. A system, as claimed in claim 57, wherein:

said first valve position allows for flow past said valve and said second valve position allows for at least substantially no flow past said valve.

59. A system, as claimed in claim 57, further comprising:

second means for sensing both an overflow condition and an underflow condition through said valve, said overflow condition being when a flow rate through said valve is more than a predetermined amount and said underflow condition being when said flow rate through said valve is less than a predetermined amount, said second means comprising said first means.

60. A method for monitoring flow through a conduit having a valve and using a movable differential pressure indicator member, wherein a switch is operatively interconnected with said valve and wherein said switch comprises a first switch member which is mechanically interconnected with said differential pressure indicator member and movable from a first switch position to a second switch position, said method comprising the steps of:

sensing a differential pressure between two axially spaced locations within said flow;

moving said differential pressure indicator member in response to at least a certain change in said differential pressure;

retaining said first switch member in said first switch position with said differential pressure indicator member when said differential pressure indicator member has moved less than a first predetermined amount;

moving said first switch member from said first switch position to a second switch position based upon said differential pressure indicator member moving more than said first predetermined amount; and changing a position of said valve upon any execution of said moving step.

61. A method, as claimed in claim 60, wherein:

said moving step is executed when there is an overflow condition through said valve, said overflow condition being when a flow rate through said valve is more than a predetermined amount.

62. A method, as claimed in claim 60, wherein:

said moving step is executed when said flow through said valve reaches a first flow rate within a first time period after said flow is initiated within said conduit.

63. A method, as claimed in claim 62, wherein:

said first switch member remains in said first switch position when there is an underflow condition through said valve, said underflow condition being when said flow through said valve fails to reach said first flow rate within said first time period after said flow is initiated within said conduit.

64. A method, as claimed in claim 60, wherein:

said moving step is executed when there is an underflow condition through said valve, said underflow condition being when a flow rate through said valve is less than a predetermined amount.

65. A method, as claimed in claim 60, further comprising the step of:

sensing both an overflow condition and an underflow condition through said valve, said overflow condition being when a flow rate through said valve is more than a predetermined amount and said underflow condition being when said flow rate through said valve is less than a predetermined amount.

66. A method, as claimed in claim 60, wherein:

moving step is executed based upon a first predetermined amount of movement of said differential pressure indicator member in a first direction which corresponds with an overflow condition through said valve, said overflow condition being when a flow rate through said valve is more than a predetermined amount; and said moving step is also executed based upon a second predetermined amount of movement of said differential pressure indicator member in a second direction which corresponds with an underflow condition through said valve, said underflow condition being when a flow rate through said valve is less than a predetermined amount, said second direction being different than said first direction.

* * * * *